(12) United States Patent
Shimajiri et al.

(10) Patent No.: US 10,107,332 B2
(45) Date of Patent: Oct. 23, 2018

(54) SLIDE STRUCTURE

(71) Applicants: NIFCO INC., Yokosuka-shi, Kanagawa (JP); INOAC CORPORATION, Anjo-shi, Aichi-ken (JP)

(72) Inventors: Naohiro Shimajiri, Yokosuka (JP); Hideomi Shibata, Anjo (JP)

(73) Assignees: NIFCO INC., Yokosuka-Shi, Kanagawa (JP); INOAC CORPORATION, Anjo-Shi, Aichi-Ken (JP)

( * ) Notice: Subject to any disclaimer, the term of this patent is extended or adjusted under 35 U.S.C. 154(b) by 0 days.

(21) Appl. No.: 15/436,254

(22) Filed: Feb. 17, 2017

(65) Prior Publication Data
US 2017/0241475 A1   Aug. 24, 2017

(30) Foreign Application Priority Data
Feb. 22, 2016  (JP) ................................. 2016-031021

(51) Int. Cl.
*F16C 29/02*  (2006.01)
*B60J 7/02*   (2006.01)
(Continued)

(52) U.S. Cl.
CPC ................ *F16C 29/02* (2013.01); *A47B 1/10* (2013.01); *B60N 2/06* (2013.01); *B60R 7/04* (2013.01);
(Continued)

(58) Field of Classification Search
CPC .. F16C 29/02; F16C 2314/72; F16C 2326/01; B60R 7/04; B60J 7/02; B60N 2/06; B60N 2/0862; A47B 1/10
(Continued)

(56) References Cited

U.S. PATENT DOCUMENTS 5,415,375 A * 5/1995 Gaboriault .............. F16K 3/182
                                                    251/158
5,582,381 A * 12/1996 Graf ....................... B60N 2/071
                                                    248/430
(Continued)

FOREIGN PATENT DOCUMENTS

EP           94701 A   * 11/1983 ............ B60P 1/6481
JP    2008-037147 A      2/2008
(Continued)

*Primary Examiner* — Marcus Charles
(74) *Attorney, Agent, or Firm* — Manabu Kanesaka

(57) ABSTRACT

A slide structure includes a slide rail and a slide lid. The slide rail includes guide wall portions disposed in a first direction orthogonal to a rail longitudinal direction. A first abutting portion is provided in a guide wall face, and a second abutting portion is provided at a position separated in the rail longitudinal direction relative to the first abutting portion, and separated in a second direction orthogonal to the rail longitudinal direction and the first direction. The slide lid can slide along the rail longitudinal direction between the guide wall portions. A first projecting portion abutting against a top portion of the first abutting portion is provided on one side in a sliding direction, and a second projecting portion abutting against a top portion of the second abutting portion in a state wherein the first projecting portion abuts against the first abutting portion is provided.

11 Claims, 14 Drawing Sheets

(51) Int. Cl.
  *A47B 1/10* (2006.01)
  *B60N 2/06* (2006.01)
  *B60R 7/04* (2006.01)
(52) U.S. Cl.
  CPC ...... *F16C 2314/72* (2013.01); *F16C 2326/01* (2013.01)
(58) Field of Classification Search
  USPC ........ 384/7, 9, 26, 34, 23–24; 248/429–430; 296/65.13
  See application file for complete search history.

(56) References Cited

U.S. PATENT DOCUMENTS

| | | | | |
|---|---|---|---|---|
| 6,416,130 | B2* | 7/2002 | Yamada | B60N 2/071 248/429 |
| 6,497,397 | B2* | 12/2002 | Fujimoto | B60N 2/071 248/430 |
| 8,616,515 | B2* | 12/2013 | Hayashi | B60N 2/0705 248/424 |
| 2005/0103968 | A1* | 5/2005 | Yamada | B60N 2/0705 248/429 |
| 2009/0092891 | A1* | 4/2009 | Kwag | H01M 2/021 429/99 |
| 2010/0170645 | A1* | 7/2010 | Lin | B60J 7/0015 160/370 |
| 2012/0033365 | A1* | 2/2012 | Shin | H04M 1/0237 361/679.01 |
| 2015/0069791 | A1* | 3/2015 | Katsura | B60J 7/024 296/216.03 |

FOREIGN PATENT DOCUMENTS

| | | | | |
|---|---|---|---|---|
| JP | 4728906 | B2 * | 7/2011 | ............. B62D 37/02 |
| JP | 5585216 | B2 * | 9/2014 | |
| JP | 5689547 | B2 * | 3/2015 | ............. B62D 37/02 |

* cited by examiner

SLIDE STRUCTURE

BACKGROUND OF THE INVENTION AND RELATED ART STATEMENT

The present invention relates to a slide structure.

In Patent Document 1, there are formed three projecting portions at intervals in a longitudinal direction in a rail portion provided in an outer case, and there are formed three convex portions at intervals in a sliding direction in a slider portion provided in a drawer portion sliding on the rail portion. In the three projecting portions and three convex portions, in a closed state and a fully open state of the drawer portion, corresponding two projecting portions and convex portions respectively abut against each other, and the drawer portion is supported (supported at two portions) in the outer case so as to suppress rattling of the drawer portion at a predetermined position.

Patent Document 1: Japanese Patent Application Publication No. 2008-37147

Incidentally, in the slide structure disclosed in the Patent Document 1, in a case wherein smooth drawing (sliding) of the drawer portion and suppression of the rattling of the drawer portion at the predetermined position are taken into account, respective strict dimensional accuracies are required for projection amounts of the three projecting portions and three convex portions. Consequently, there is a concern over the increase of loads in a product design and a production process.

In view of the aforementioned circumstances, an object of the present invention is to provide a slide structure capable of smoothly sliding a slider relative to a rail with a simple structure, and capable of suppressing rattling of the slider at a predetermined position.

Further objects and advantages of the invention will be apparent from the following description of the invention.

SUMMARY OF THE INVENTION

A slide structure according to the first aspect comprises a rail including a pair of guide wall portions disposed to be opposed in a first direction orthogonal to a longitudinal direction, wherein convex first abutting portions are provided on a guide wall face of one guide wall portion at an interval in the longitudinal direction, and convex second abutting portions are provided on the guide wall face at a position separated in the longitudinal direction relative to the first abutting portion and separated in a second direction orthogonal to the longitudinal direction and the first direction at an interval in the longitudinal direction; and a slider disposed between the pair of guide wall portions, and capable of sliding along the longitudinal direction. A first projecting portion abutting against top portions of the first abutting portions is provided on one side in a sliding direction, and a second projecting portion abutting against top portions of the second abutting portions in a state wherein the first projecting portion abuts against the top portions of the first abutting portions is provided on the other side in the sliding direction.

In the slide structure according to the first aspect, the second abutting portion is provided at a position separated in a longitudinal direction of the rail (hereinafter, described as appropriately a "rail longitudinal direction") relative to the first abutting portion. Consequently, when the slider slides along the rail longitudinal direction, and in the state wherein the first projecting portion abuts against the top portion of the first abutting portion, the second projecting portion abuts against the top portion of the second abutting portion, the slider is supported by the rail at two portions at an interval in the rail longitudinal direction so as to suppress rattling (rattling in the first direction) of the slider relative to the rail.

Also, in the aforementioned slide structure, the second abutting portion is provided at a position separated in the second direction relative to the first abutting portion. Consequently, when the slider slides on the rail, abutting of the first abutting portion of the rail and the second projecting portion of the slider is avoided, and abutting of the second abutting portion of the rail and the first projecting portion of the slider is avoided. Thereby, for example, compared to a structure wherein the first abutting portion and the second abutting portion are alternately disposed along the rail longitudinal direction, the slider can smoothly slide relative to the rail even if respective projection amounts of the first abutting portion, the second abutting portion, the first projecting portion, and the second projecting portion are not strictly set.

From the above, in the aforementioned slide structure, with a simple structure wherein the second abutting portion is disposed at the position separated in the rail longitudinal direction relative to the first abutting portion and separated in the second direction, the slider can smoothly slide relative to the rail, and the rattling of the slider at a predetermined position can be suppressed.

As for the slide structure according to a second aspect, in the slide structure according to the first aspect, in an interval between the pair of guide wall portions, a first area on one side in the second direction differs from a second area adjacent to the other side in the second direction relative to the first area, and the first abutting portion is disposed in the first area, and the second abutting portion is disposed in the second area.

In the slide structure according to the second aspect, the first area and the second area which have different intervals divide the pair of guide wall portions, and the first abutting portion is disposed in the first area, and the second abutting portion is disposed in the second area. Consequently, when the slider slides on the rail, while suppressing the slider from a lateral shift (a shift in the second direction) relative to the rail, the first projecting portion is moved along the first area so as to abut against the top portion of the first abutting portion, and the second projecting portion is moved along the second area so as to abut against the top portion of the second abutting portion. Thereby, the slider can slide relative to the rail more smoothly.

As for the slide structure according to a third aspect, in the slide structure according to the first aspect or the second aspect, both end portions in the respective longitudinal direction of the first abutting portion and the second abutting portion are respectively inclined.

In the slide structure according to the third aspect, both end portions in the respective rail longitudinal direction of the first abutting portion and the second abutting portion are respectively inclined. Consequently, when the slider slides on the rail, the first projecting portion can smoothly move on the top portion of the first abutting portion, and the second projecting portion can smoothly move on the top portion of the second abutting portion. Thereby, in the aforementioned slide structure, the slider can smoothly slide to the predetermined position where the rattling of the slider can be suppressed.

As for the slide structure according to a fourth aspect, in the slide structure according to any one of the first to third aspects, the respective projection amounts of the first abutting portion and the second abutting portion are smaller than the respective projection amounts of the first projecting portion and the second projecting portion.

In the slide structure according to the fourth aspect, the respective projection amounts of the first abutting portion and the second abutting portion are smaller than the respective projection amounts of the first projecting portion and the second projecting portion. Consequently, for example, compared to a structure wherein the respective projection amounts of the first abutting portion and the second abutting portion are larger than the respective projection amounts of the first projecting portion and the second projecting portion, at a production time of the rail, a size accuracy of the rail can be easily secured.

As for the slide structure according to a fifth aspect, in the slide structure according to any one of the first to fourth aspects, a gap between the guide wall face of one guide wall portion and the first projecting portion differs from a gap between the guide wall face of one guide wall portion and the second projecting portion.

In the slide structure according to the fifth aspect, the gap between the guide wall face of one guide wall portion and the first projecting portion differs from the gap between the guide wall face of one guide wall portion and the second projecting portion. Here, for example, in a case wherein the gap between the guide wall face of one guide wall portion and the second projecting portion is smaller than the gap between the guide wall face of one guide wall portion and the first projecting portion, when the slider slides on the rail, the rattling of the slider relative to the rail is effectively suppressed by the abutting between the guide wall face of one guide wall portion and the second projecting portion.

As for the slide structure according to a sixth aspect, in the slide structure according to any one of the first to fifth aspects, in the slider, a third projecting portion is provided in the first direction and on a side opposite to the first projecting portion, and a fourth projecting portion is provided in the first direction and on a side opposite to the second projecting portion.

In the slide structure according to the sixth aspect, in the slider, the third projecting portion is provided in the first direction and on the side opposite to the first projecting portion, and the fourth projecting portion is provided in the first direction and on the side opposite to the second projecting portion, so that when the slider slides on the rail, a sliding area (contact area) of the slider and the rail is reduced, and the slider slides relative to the rail more smoothly.

The slide structure according to a seventh aspect comprises a rail including three or more guide wall portions disposed to be opposed at an interval in a first direction orthogonal to a longitudinal direction, wherein convex first abutting portions are provided on one guide wall face of the first guide wall portion and the second guide wall portion disposed to be opposed to each other at an interval in the longitudinal direction, and convex second abutting portions are provided on one guide wall face of the second guide wall portion and the third guide wall portion disposed to be opposed to each other at a position separated in the longitudinal direction relative to the first abutting portion at an interval in the longitudinal direction; and a slider capable of sliding along the longitudinal direction of the rail. A first projecting portion disposed between the first guide wall portion and the second guide wall portion, and abutting against top portions of the first abutting portions is provided on one side in a sliding direction, and a second projecting portion disposed between the second guide wall portion and the third guide wall portion, and abutting against top portions of the second abutting portions in a state wherein the first projecting portion abuts against the top portions of the first abutting portions is provided on the other side in the sliding direction.

In the slide structure according to the seventh aspect, the second abutting portion is provided at a position separated in a longitudinal direction of the rail (hereinafter, described as appropriately a "rail longitudinal direction") relative to the first abutting portion. Consequently, when the slider slides along the rail longitudinal direction, and in the state wherein the first projecting portion abuts against the top portion of the first abutting portion, the second projecting portion abuts against the top portion of the second abutting portion, the slider is supported by the rail at two portions at an interval in the rail longitudinal direction so as to suppress the rattling (rattling in the first direction) of the slider relative to the rail.

Also, in the aforementioned slide structure, the first abutting portion is disposed between the first guide wall portion and the second guide wall portion, and the second abutting portion is disposed between the second guide wall portion and the third guide wall portion. Namely, the first abutting portion and the second abutting portion are respectively provided in separate areas in the first direction, so that when the slider slides on the rail, abutting of the first abutting portion of the rail and the second projecting portion of the slider is avoided, and abutting of the second abutting portion of the rail and the first projecting portion of the slider is avoided. Thereby, for example, compared to the structure wherein the first abutting portion and the second abutting portion are alternately disposed along the rail longitudinal direction, the slider can smoothly slide relative to the rail even if the respective projection amounts of the first abutting portion, the second abutting portion, the first projecting portion, and the second projecting portion are not strictly set.

From the above, in the aforementioned slide structure, with a simple structure wherein the first abutting portion and the second abutting portion are separated in the rail longitudinal direction, and the first abutting portion and the second abutting portion are respectively disposed in the separate areas in the first direction, the slider can smoothly slide relative to the rail, and the rattling of the slider at the predetermined position can be suppressed.

The slide structure according to an eighth aspect comprises a pair of rails including a guide wall portion extending in a first direction orthogonal to a longitudinal direction, and disposed to be opposed at an interval in a second direction orthogonal to the longitudinal direction and the first direction; and a slider disposed between the guide wall portions of the pair of rails, and capable of sliding in the longitudinal direction. Among the pair of rails, on a guide wall face of the guide wall portion of one rail, there are provided convex first abutting portions at an interval in the longitudinal direction, and on the guide wall face, there are provided convex second abutting portions at a position separated in the longitudinal direction relative to the first abutting portion, and separated in the first direction at an interval in the longitudinal direction. Also, on one side in a sliding direction of the slider, there is provided a first projecting portion abutting against a top portion of the first abutting portion, and on the other side in the sliding direction, there is provided a second projecting portion abutting against a top portion of the second abutting portion in a state wherein the first projecting portion abuts against the top portion of the first abutting portion.

In the slide structure according to the eighth aspect, the second abutting portion is provided at the position separated in the longitudinal direction of one rail (hereinafter, described as appropriately the "rail longitudinal direction") relative to the first abutting portion. Consequently, when the slider slides along the rail longitudinal direction, and in the state wherein the first projecting portion abuts against the top portion of the first abutting portion, the second projecting portion abuts against the top portion of the second abutting portion, the slider is supported by the pair of rails at two portions at an interval in the rail longitudinal direction so as to suppress rattling (rattling in the second direction) of the slider relative to the rail.

Also, in the aforementioned slide structure, there is provided the second abutting portion at the position separated in the first direction relative to the first abutting portion. Consequently, when the slider slides on one rail, abutting of the first abutting portion of one rail and the second projecting portion of the slider is avoided, and abutting of the second abutting portion of one rail and the first projecting portion of the slider is avoided. Thereby, for example, compared to the structure wherein the first abutting portion and the second abutting portion are alternately disposed along the rail longitudinal direction, the slider can smoothly slide relative to one rail even if the respective projection amounts of the first abutting portion, the second abutting portion, the first projecting portion, and the second projecting portion are not strictly set.

From the above, in the aforementioned slide structure, with a simple structure wherein the second abutting portion is disposed at the position separated in the rail longitudinal direction relative to the first abutting portion, and separated in the first direction, the slider can smoothly slide relative to the rail, and the rattling of the slider at the predetermined position can be suppressed.

The present invention can provide the slide structure capable of smoothly sliding the slider relative to the rail with the simple structure, and capable of suppressing the rattling of the slider at the predetermined position.

DETAILED DESCRIPTION OF PREFERRED EMBODIMENTS

Next, one embodiment of a slide structure according to the present invention will be explained using FIG. 1 to FIG. 10. A slide structure S of the present embodiment is applied to a storage container 20 for a vehicle. Incidentally, an arrow UP shown in a part of the drawings represents an upper side of the storage container 20 wherein the slide structure of the present embodiment is applied; an arrow W represents a width direction of the storage container 20; and an arrow M represents a sliding direction (slide direction) of a slide lid 22 of the storage container 20.

Figure 1:
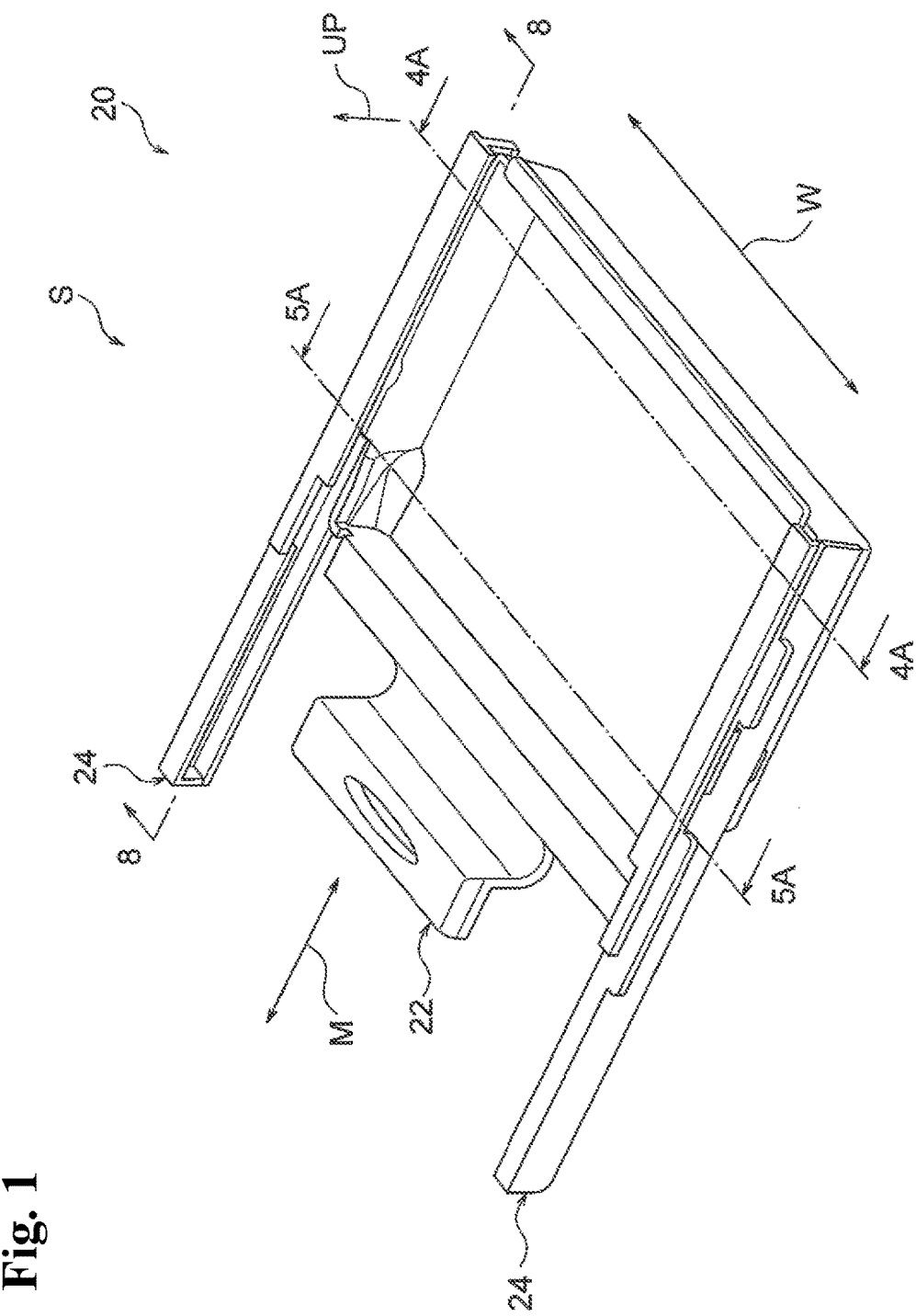
FIG. 1 is a perspective view wherein a slide lid of a storage container to which a slide structure of one embodiment is applied is viewed obliquely from above, and shows a state wherein the slide lid is located in a closed position according to the present invention.
Figure 2:
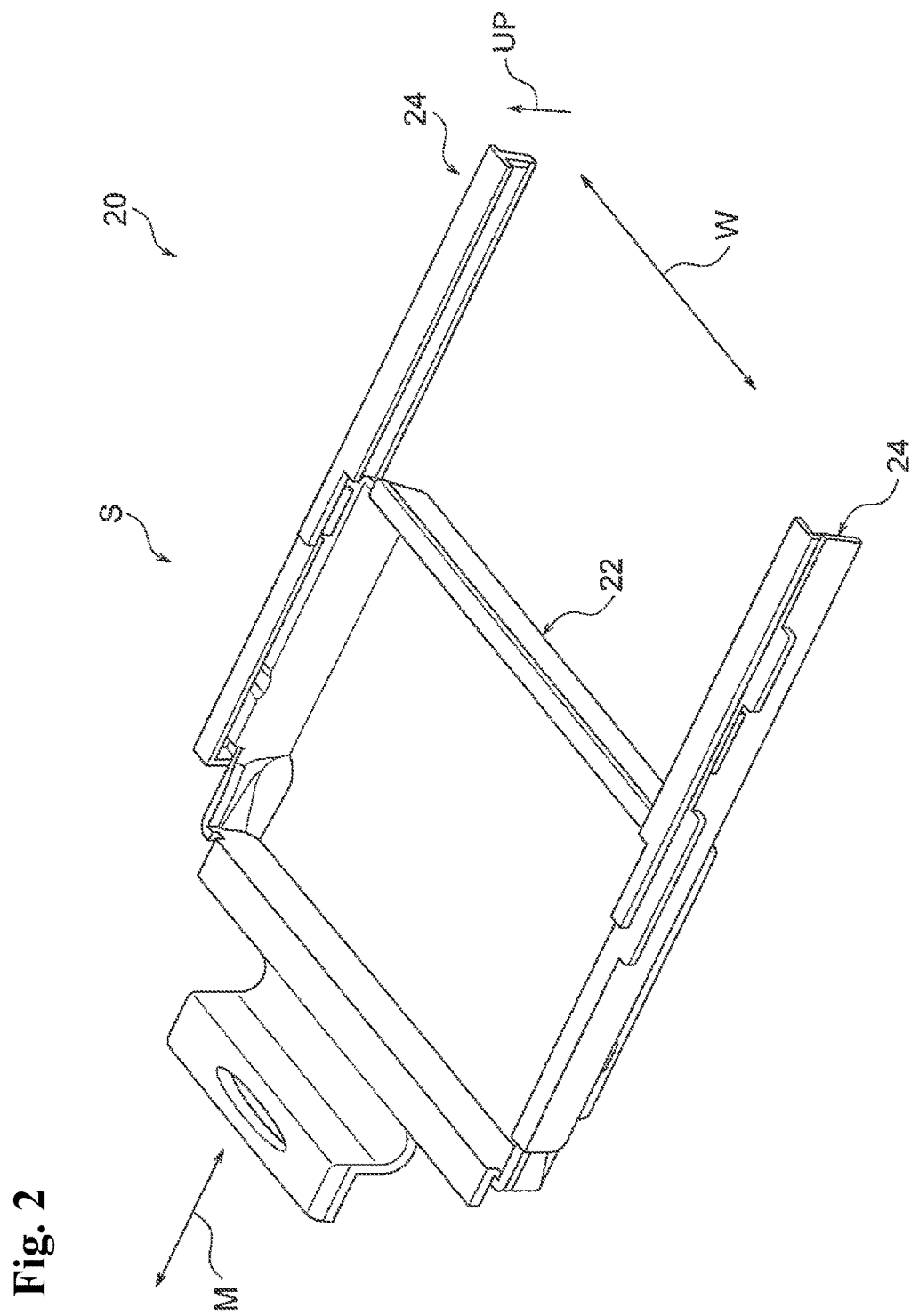
FIG. 2 is a perspective view of the slide lid of the storage container in FIG. 1, and shows a state wherein the slide lid is located in an open position.
Figure 3:
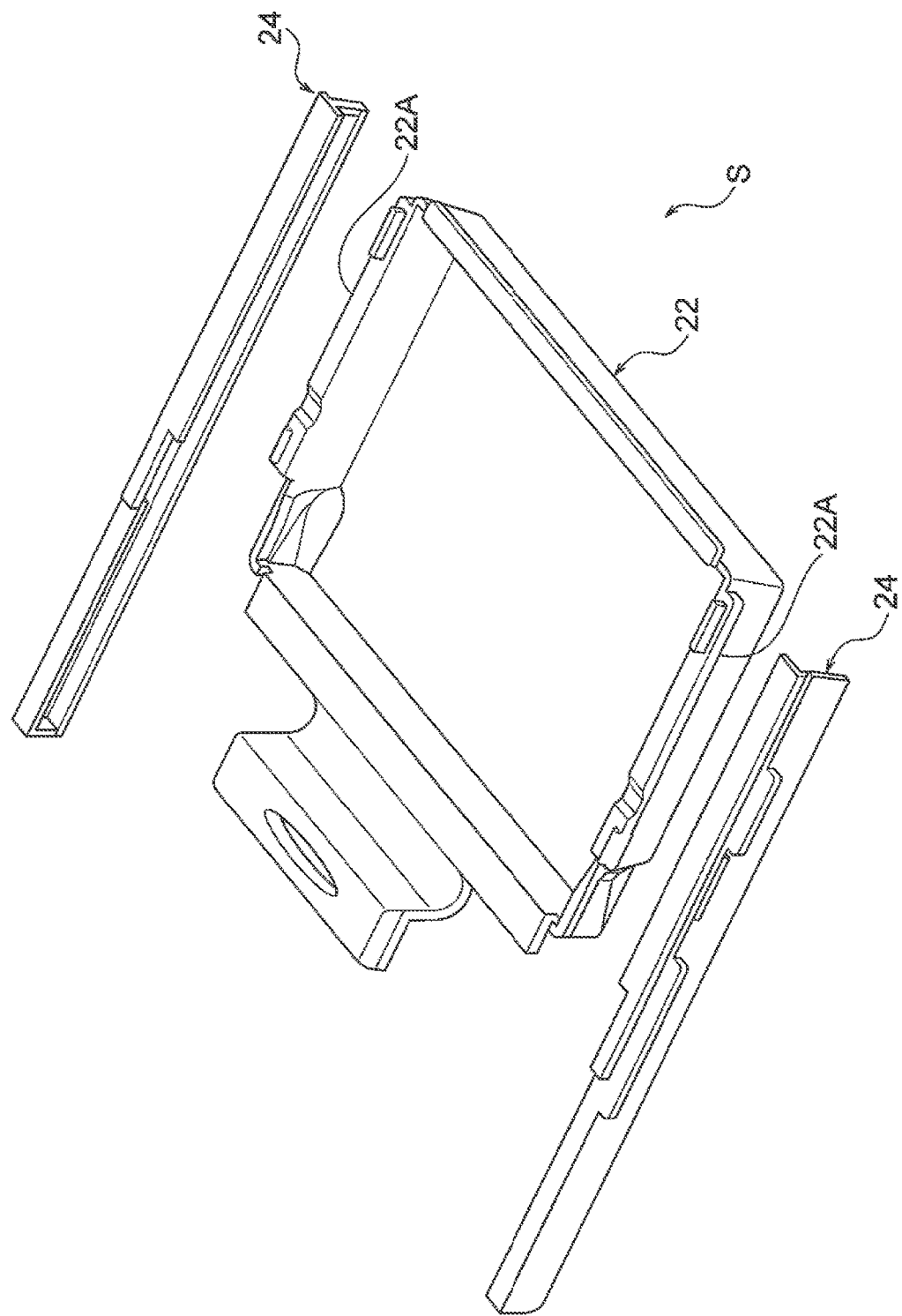
FIG. 3 is a perspective view showing a state wherein the slide lid in FIG. 1 is removed from a slide rail.

As shown in FIG. 1 and FIG. 2, the storage container 20 of the present embodiment is an opening-and-closing type storage container provided in, for example, a console box of a vehicle. The storage container 20 comprises a container main member (not shown in the drawings) which can house small articles and the like; a pair of slide rails 24 provided at an interval in the width direction at edge portions of an opening opened on an upper side of the container main member; and the slide lid 22 slidably supported by the pair of slide rails 24, and opening and closing the aforementioned opening of the container main member. Then, as shown in FIG. 1 to FIG. 3, the slide structure S of the present embodiment includes the slide rails 24 and the slide lid 22. Incidentally, the slide rails 24 of the present embodiment are one example of a rail in the present invention, and the slide lid 22 of the present embodiment is one example of a slider in the present invention.

(Slide Rails)

Figure 4A:
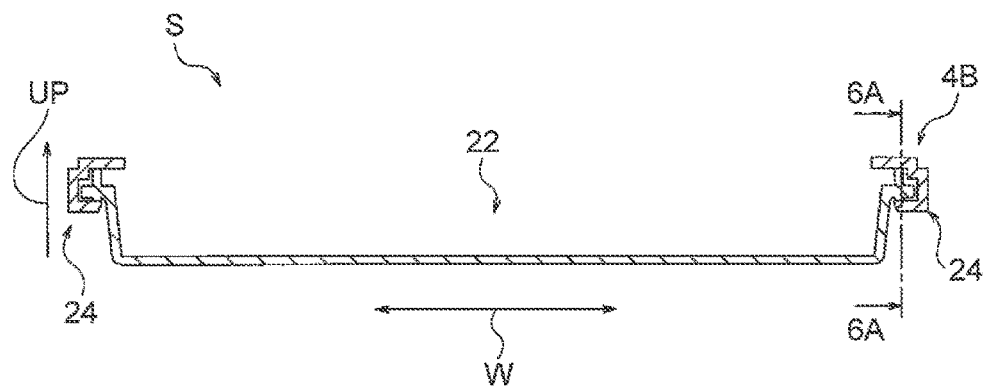
FIG. 4(A) is an end view taken along a line 4A-4A in FIG. 1.
Figure 5A:
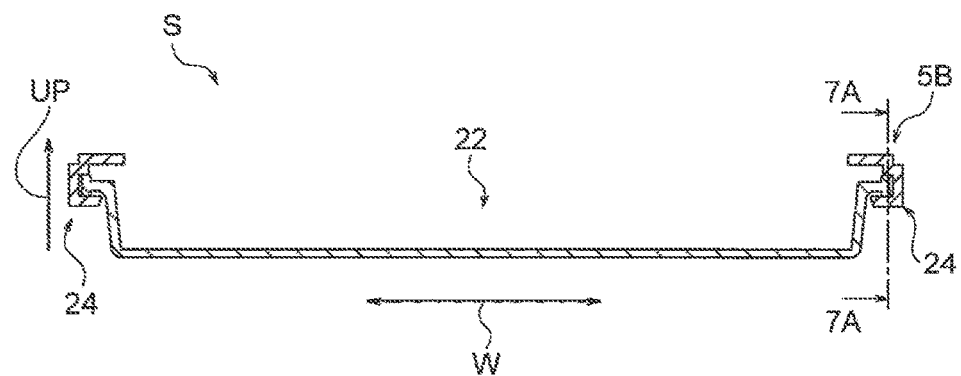
FIG. 5(A) is an end view taken along a line 5A-5A in FIG. 1.

As shown in FIG. 4(A) and FIG. 5(A), the slide rails 24 are formed by a resin material, and comprise a pair of guide wall portions 26 and 28 disposed to be opposed in the first direction orthogonal to a longitudinal direction (hereinafter, will be described as appropriately a "rail longitudinal direction"). Incidentally, in the present embodiment, the longitudinal direction of the slide rails 24 and the sliding direction of the slide lid 22 are the same direction. Also, the "first direction" here is the same direction as an up-and-down direction of the storage container 20. Here, in the present embodiment, the guide wall portion 26 is disposed to be opposed on an upper side of the guide wall portion 28. Incidentally, the guide wall portion 26 of the present embodiment is one example of one guide wall portion in the present invention, and the guide wall portion 28 of the present embodiment is one example of the other guide wall portion in the present invention. Incidentally, in the slide rail 24, the pair of guide wall portions 26 and 28 is portions restricting a movement in the first direction of the later-described end portion 22A of the slide lid 22 disposed between the pair of guide wall portions 26 and 28.

In an interval between the pair of guide wall portions 26 and 28, a first area 30 on one side in a second direction orthogonal to the rail longitudinal direction and the first direction differs from a second area 32 adjacent to the other side in the second direction relative to the first area 30. Specifically, an interval L1 in the first area 30 is wider than an interval L2 in the second area 32. Incidentally, in the present embodiment, there is formed a step 26B along the first direction on a guide wall face 26A of the guide wall portion 26, and the first area 30 and the second area 32 are divided as a boundary of the step 26B. Also, the "second direction" here is the same direction as the width direction of the storage container 20.

Figure 4B:
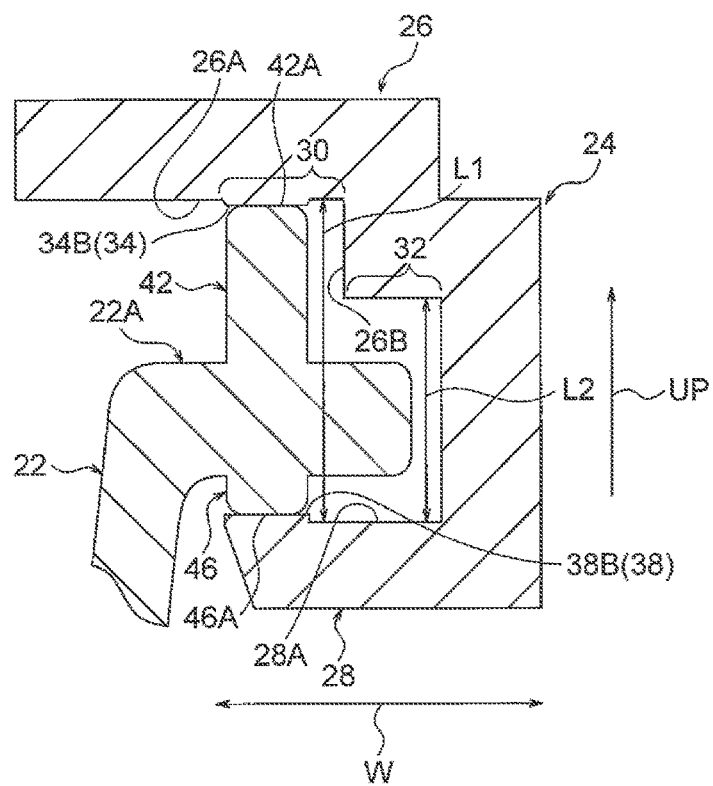
FIG. 4(B) is an enlarged view of a portion indicated by an arrow 4B in FIG. 4(A)
Figure 6A:
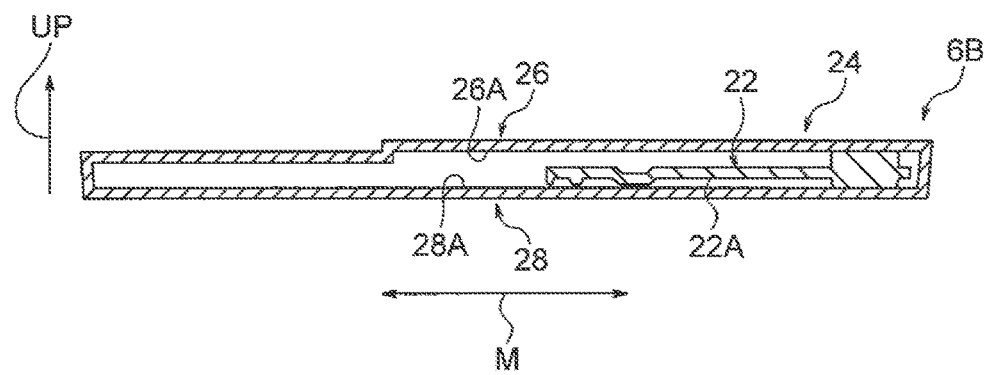
FIG. 6(A) is an end view taken along a line 6A-6A in FIG. 4(A)
Figure 6B:
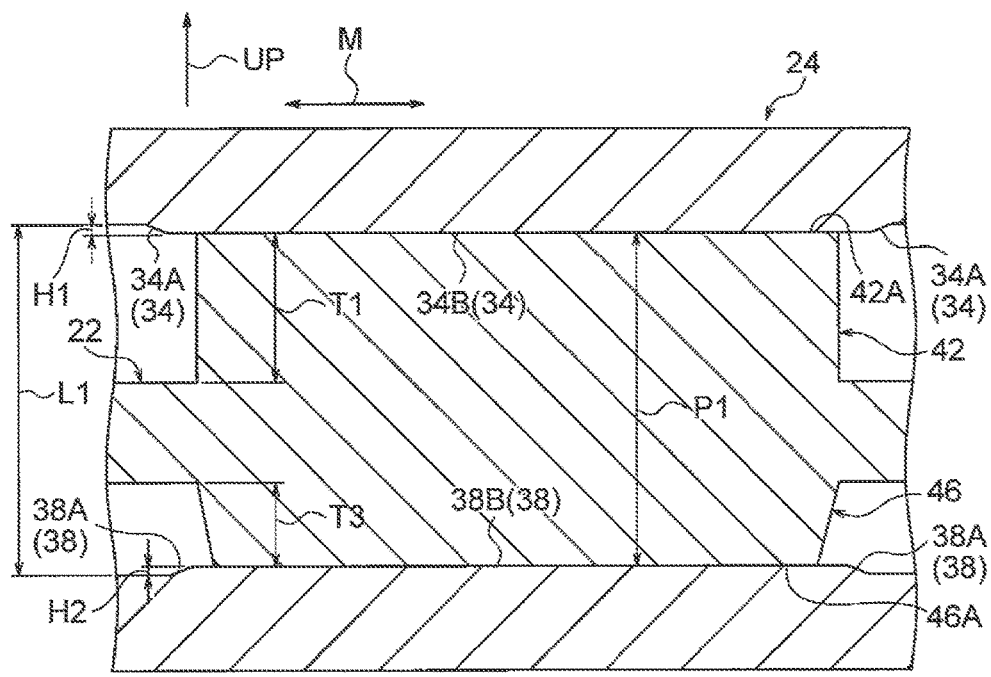
FIG. 6(B) is an enlarged view of a portion indicated by an arrow 6B in FIG. 6(A)
Figure 10:
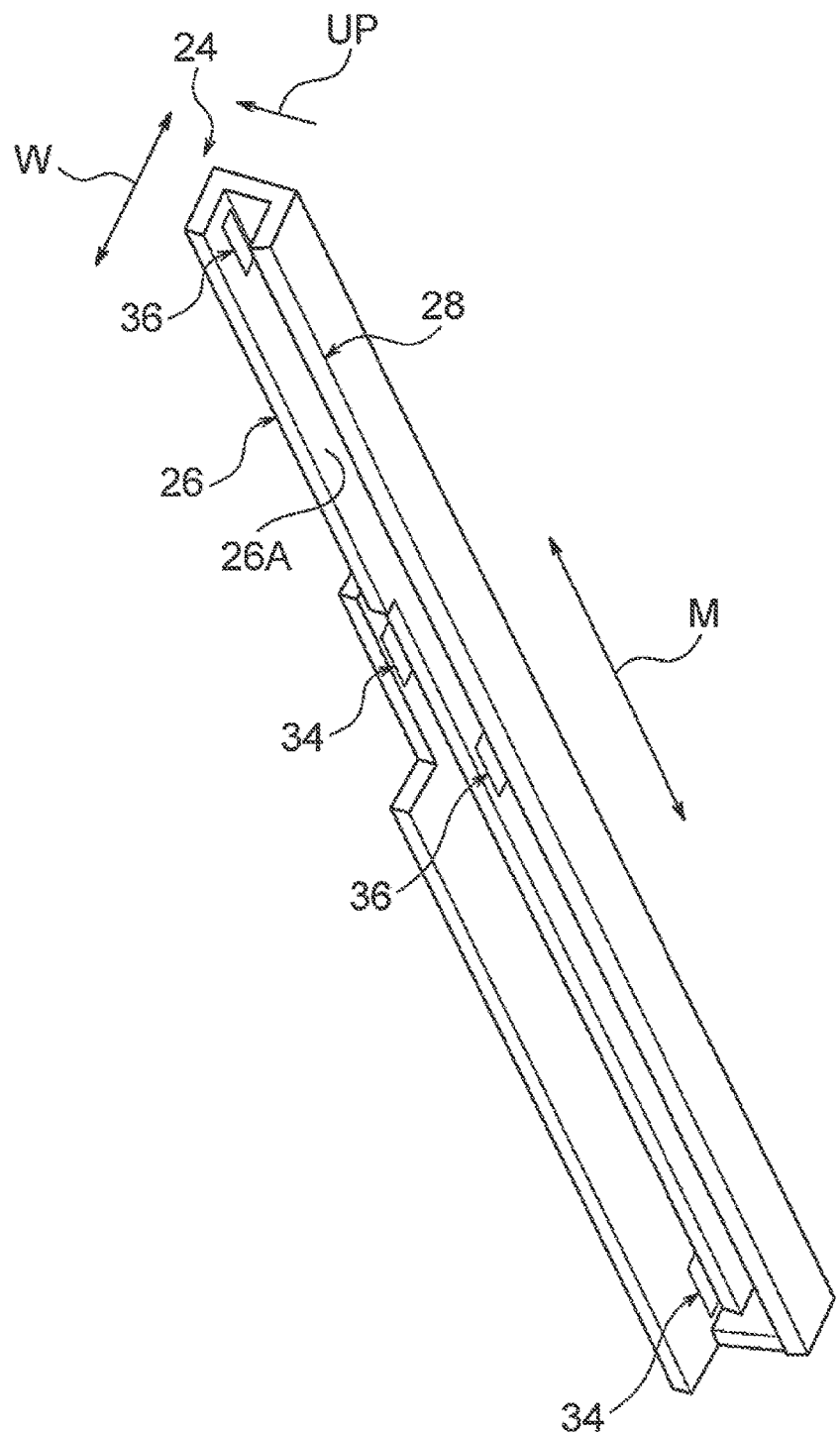
FIG. 10 is a perspective view wherein the slide rail in FIG. 3 is viewed obliquely from below.

On the guide wall face 26A of the guide wall portion 26, there is provided a plurality (two in the present embodiment) of convex first abutting portions 34 (see FIG. 4(B), FIG. 6(B), and FIG. 10) protruding downwardly at an interval in the rail longitudinal direction. The first abutting portions 34 are respectively disposed in the first area 30.

Figure 5B:
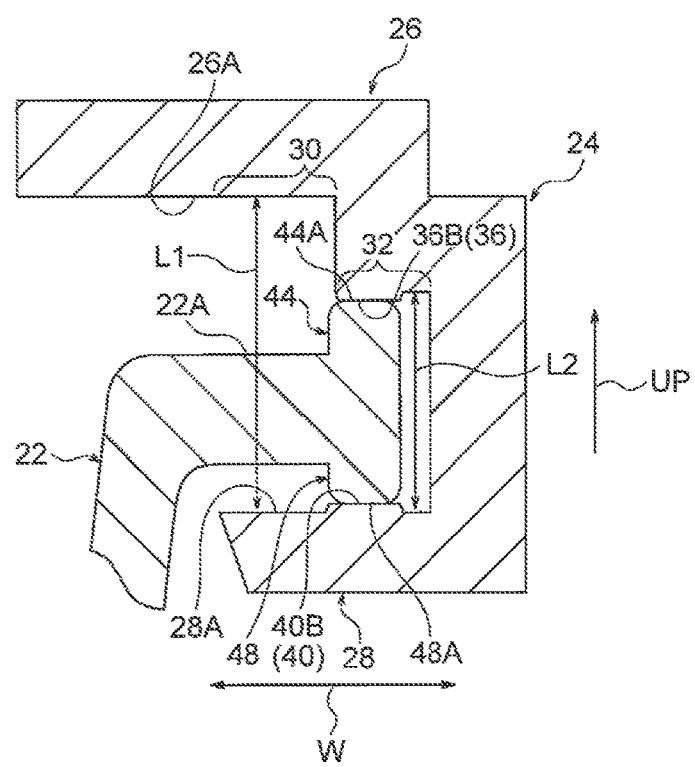
FIG. 5(B) is an enlarged view of a portion indicated by an arrow 5B in FIG. 5(A)
Figure 7A:
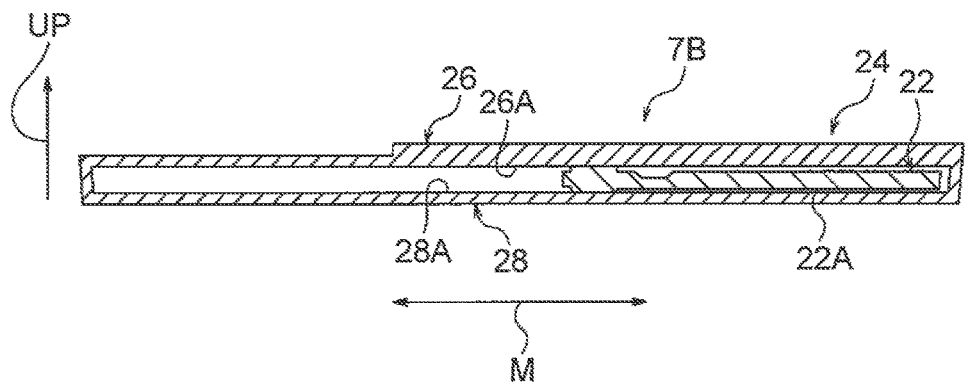
FIG. 7(A) is an end view taken along a line 7A-7A in FIG. 5(A)
Figure 7B:
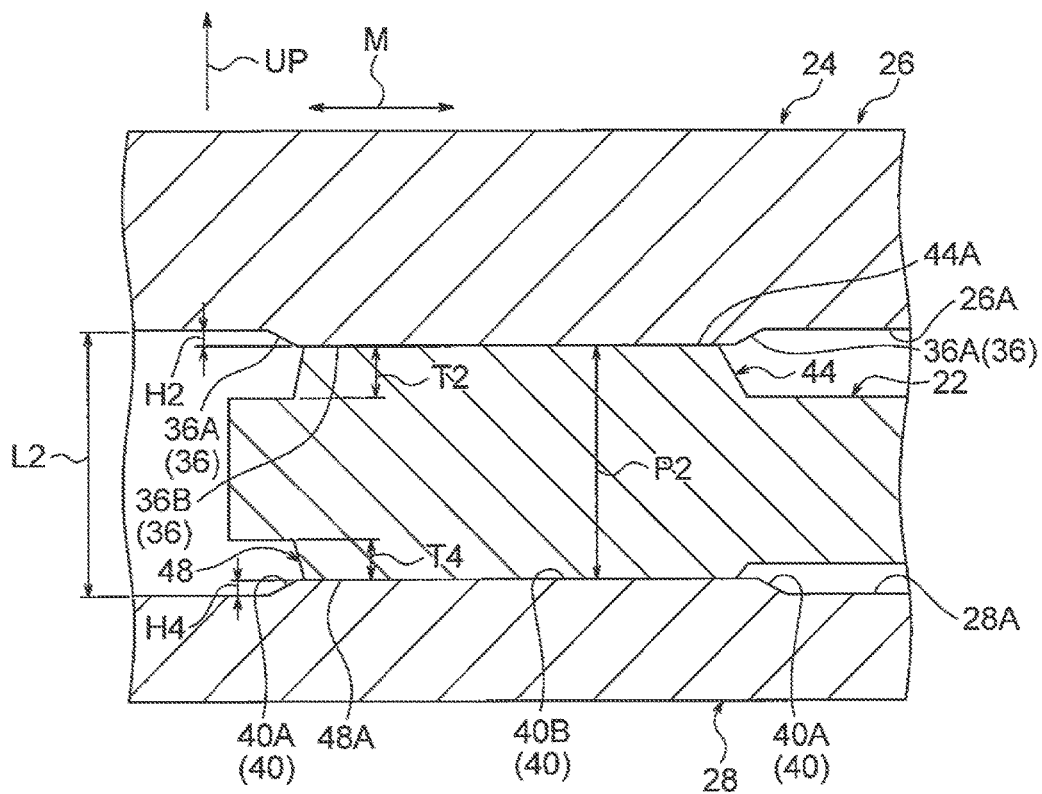
FIG. 7(B) is an enlarged view of a portion indicated by an arrow 7B in FIG. 7(A)
Figure 8:
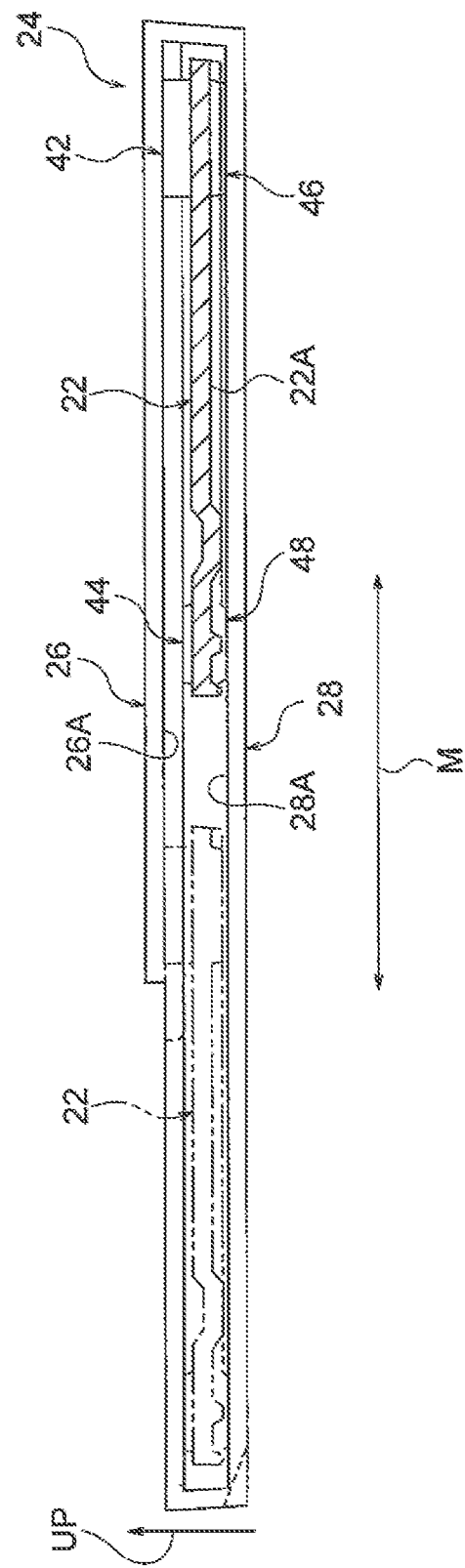
FIG. 8 is a cross-sectional view taken along a line 8-8 in FIG. 1.

Also, on the guide wall face 26A of the guide wall portion 26, there is provided a plurality (two in the present embodiment) of convex second abutting portions 36 (see FIG. 5(B), FIG. 7(B), and FIG. 10) protruding downwardly at an interval in the rail longitudinal direction. The second abutting portions 36 are respectively disposed at a position separated in the rail longitudinal direction relative to the first abutting portions 34, and separated in the second direction. Also, the second abutting portions 36 are respectively disposed in the second area 32.

Figure 9:
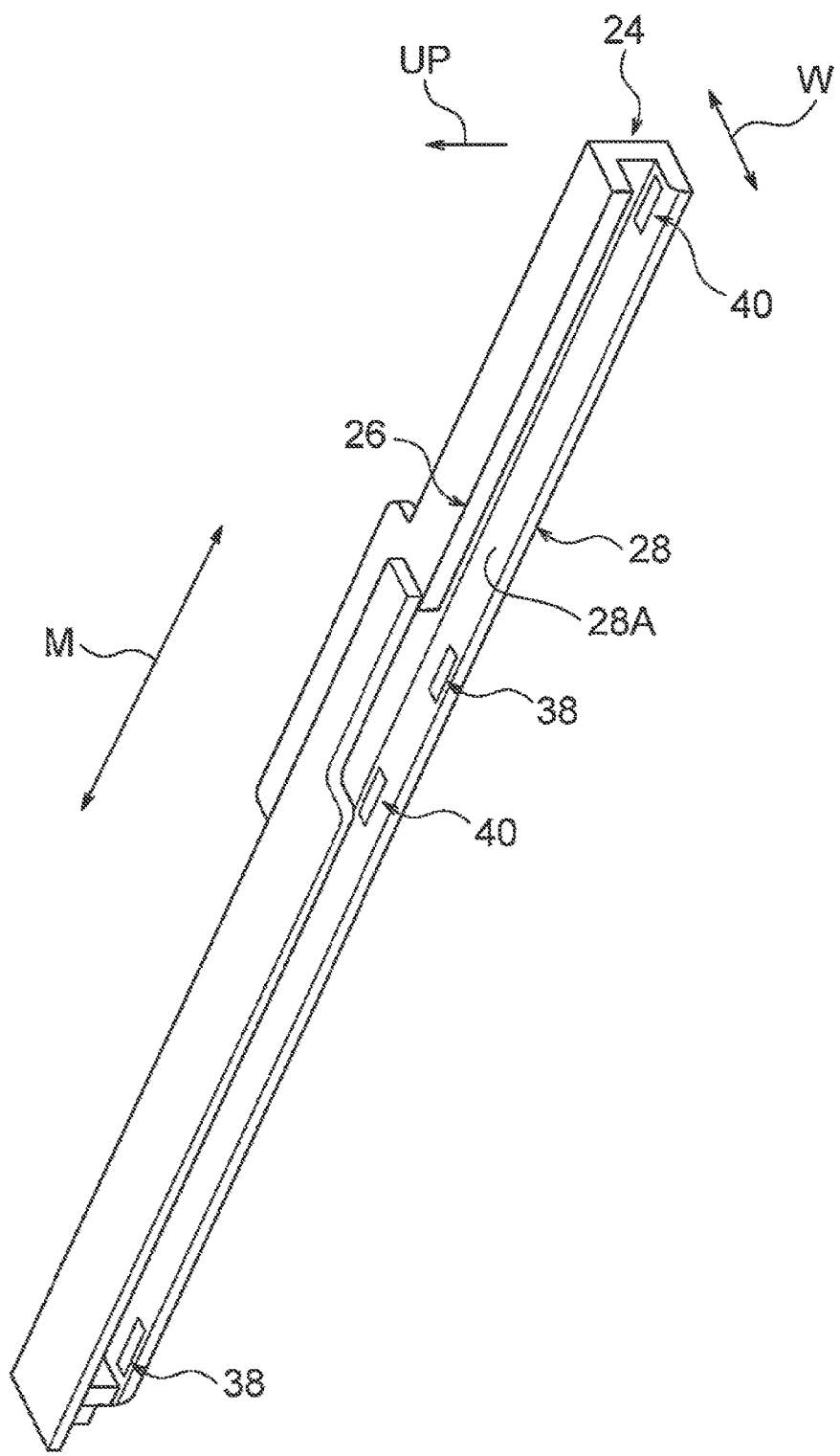
FIG. 9 is a perspective view wherein the slide rail in FIG. 3 is viewed obliquely from above.

On a guide wall face 28A of the guide wall portion 28, there is provided a plurality (two in the present embodiment) of convex third abutting portions 38 (see FIG. 4(B), FIG. 6(B), and FIG. 9) protruding upwardly at an interval in the rail longitudinal direction. The third abutting portions 38 are respectively disposed at a position facing the first abutting portions 34 of the guide wall portion 26. Consequently, the third abutting portions 38 are respectively disposed in the first area 30.

Also, on the guide wall face 28A of the guide wall portion 28, there is provided a plurality (two in the present embodiment) of convex fourth abutting portions 40 (see FIG. 5(B), FIG. 7(B), and FIG. 9) protruding upwardly at an interval in the rail longitudinal direction. The fourth abutting portions 40 are respectively disposed at a position facing the second abutting portions 36 of the guide wall portion 26. Namely, the fourth abutting portions 40 are respectively disposed at a position separated in the rail longitudinal direction relative to the third abutting portions 38, and separated in the second direction. Consequently, the fourth abutting portions 38 are respectively disposed in the second area 32.

As shown in FIG. 6(B), both end portions in the respective rail longitudinal direction of the first abutting portions 34 and the third abutting portions 38 are respectively inclined. Namely, on both end portions in the respective rail longitudinal direction of the first abutting portions 34 and the third abutting portions 38, there are respectively formed inclined faces 34A and 38A.

As shown in FIG. 7(B), both end portions in the respective rail longitudinal direction of the second abutting portions 36 and the fourth abutting portions 40 are respectively inclined. Namely, on both end portions in the respective rail longitudinal direction of the second abutting portions 36 and the fourth abutting portions 40, there are respectively formed inclined faces 36A and 40A.

(Slide Lid)

As shown in FIG. 4(A) and FIG. 5(A), the slide lid 22 is formed by a resin material, and the end portion 22A in the width direction is disposed between the pair of guide wall portions 26 and 28, and can slide along the rail longitudinal direction of the slide rail 24. Incidentally, on an upper face of the slide lid 22, there is attached a member such as a panel and the like for forming a design face; however, the aforementioned member is omitted in the drawings.

On one side in the sliding direction of the plate-like end portion 22A of the slide lid 22, there is provided a first projecting portion 42 projecting upwardly. When the slide lid 22 slides on the slide rail 24, the first projecting portion 42 moves in the first area 30, and abuts against a top portion 34B of the first abutting portion 34.

On the other side in the sliding direction of the end portion 22A of the slide lid 22, there is provided a second projecting portion 44 projecting upwardly. The second projecting portion 44 is disposed at a position separated in the sliding direction relative to the first projecting portion 42, and separated in the second direction. Consequently, when the slide lid 22 slides on the slide rail 24, the second projecting portion 44 moves in the second area 32, and abuts against a top portion 36B of the second abutting portion 36. Also, the second projecting portion 44 is disposed in such a way as to abut against the top portion 36B of the second abutting portion 36 in a state wherein the first projecting portion 42 abuts against the top portion 34B of the first abutting portion 34.

On one side in the sliding direction of the end portion 22A of the slide lid 22, there is provided a third projecting portion 46 projecting downwardly which is in the first direction and on a side opposite to the first projecting portion 42. When the slide lid 22 slides on the slide rail 24, while a top portion 46A is sliding on the guide wall face 28A of the guide wall portion 28, the third projecting portion 46 moves in the first area 30, climbs over the third abutting portion 38, and abuts against a top portion 38B.

Also, on the other side in the sliding direction of the end portion 22A of the slide lid 22, there is provided a fourth projecting portion 48 projecting downwardly which is in the first direction and on a side opposite to the second projecting portion 44. The fourth projecting portion 48 is disposed at a position separated in the sliding direction relative to the third projecting portion 46, and separated in the second direction. Consequently, when the slide lid 22 slides on the slide rail 24, while a top portion 48A is sliding on the guide wall face 28A of the guide wall portion 28, the fourth projecting portion 48 moves in the second area 32, climbs over the fourth abutting portion 40, and abuts against a top portion 40B. Also, the fourth projecting portion 48 is disposed in such a way as to abut against the top portion 40B of the fourth abutting portion 40 in a state wherein the third projecting portion 46 abuts against the top portion 38B of the third abutting portion 38.

Also, in a state wherein the storage container 20 is closed by the slide lid 22, a top portion 42A of the first projecting portion 42 abuts against the top portion 34B of the first abutting portion 34 on a deep side (one side in the sliding direction); a top portion 44A of the second projecting portion abuts against the top portion 36B of the second abutting portion 36 on a deep side; the top portion 46A of the third projecting portion 46 abuts against the top portion 38B of the third abutting portion 38 on a deep side; and the top portion 48A of the fourth projecting portion 48 abuts against the top portion 40B of the fourth abutting portion 40 on a deep side. In the closed state, portions corresponding to the first projecting portion 42 and the third projecting portion 46 of the end portion 22A of the slide lid 22 are sandwiched by the first abutting portion 34 on the deep side and the third abutting portion 38 on the deep side. Also, portions corresponding to the second projecting portion 44 and the fourth projecting portion 48 of the end portion 22A of the slide lid 22 are sandwiched by the second abutting portion 36 on the deep side and the fourth abutting portion 40 on the deep side. Thereby, rattling of the slide lid 22 relative to the slide rail 24 in a state wherein the slide lid 22 is closed (state wherein the slide lid 22 is located in a closed position (see FIG. 1 and solid line parts in FIG. 8)) is suppressed.

On the other hand, in a state wherein the slide lid 22 is slid to open the storage container 20, the top portion 42A of the first projecting portion 42 abuts against the top portion 34B of the first abutting portion 34 on a near side (the other side in the sliding direction); the top portion 44A of the second projecting portion 44 abuts against the top portion 36B of the second abutting portion 36 on a near side; the top portion 46A of the third projecting portion 46 abuts against the top portion 38B of the third abutting portion 38 on a near side; and the top portion 48A of the fourth projecting portion 48 abuts against the top portion 40B of the fourth abutting portion on a near side. In the open state, the portions corresponding to the first projecting portion 42 and the third projecting portion 46 of the end portion 22A of the slide lid 22 are sandwiched by the first abutting portion 34 on the near side and the third abutting portion 38 on the near side. Also, the portions corresponding to the second projecting portion 44 and the fourth projecting portion 48 of the end portion 22A of the slide lid 22 are sandwiched by the second abutting portion 36 on the near side and the fourth abutting portion 40 on the near side. Thereby, the rattling of the slide lid 22 relative to the slide rail 24 in a state wherein the slide lid 22 is open (state wherein the slide lid 22 is located in an open position (see FIG. 2 and broken line parts in FIG. 8)) is suppressed.

As shown in FIG. 4(A) to FIG. 7(B), respective projection amounts H1 to H4 of the first abutting portion 34, the second abutting portion 36, the third abutting portion 38, and the fourth abutting portion 40 are smaller than respective projection amounts T1 to T4 of the first projecting portion 42, the second projecting portion 44, the third projecting portion 46, and the fourth projecting portion 48.

Also, in a middle of sliding of the slide lid 22 (for example, a half-open state of the slide lid 22), a first gap between the guide wall face 26A of the guide wall portion 26 and the top portion 42A of the first projecting portion 42 differs from a second gap between the guide wall face 26A of the guide wall portion 26 and the top portion 44A of the second projecting portion 44. Specifically, in the present embodiment, the second gap is smaller than the first gap. In other words, a difference between the interval L2 in the second area and a length P2 (see FIG. 7(B)) along the first direction from the top portion 44A of the slide lid 22 to the top portion 48A is smaller than a difference between the interval L1 in the first area 30 and a length P1 (see FIG. 6(B)) along the first direction from the top portion 42A of the slide lid 22 to the top portion 46A.

Next, an operation effect of the present embodiment will be explained.

In the slide structure S, there is provided the second abutting portion 36 relative to the first abutting portion 34 at a position separated in the rail longitudinal direction. Consequently, the slide lid 22 slides along the rail longitudinal direction, and in a state wherein the top portion 42A of the first projecting portion 42 abuts against the top portion 34B of the first abutting portion 34, when the top portion 44A of the second projecting portion 44 abuts against the top portion 36B of the second abutting portion 36, the slide lid 22 is supported by the slide rail 24 at two portions at an interval in the rail longitudinal direction so as to suppress the rattling of the slide lid 22 relative to the slide rail 24 attached to the container main member.

Also, in the aforementioned slide structure S, there is provided the second abutting portion 36 relative to the first abutting portion 34 at the position separated in the second direction. Consequently, when the slide lid 22 slides on the slide rail 24, abutting of the first abutting portion 34 of the slide rail 24 and the second projecting portion 44 of the slide lid 22 is avoided, and abutting of the second abutting portion 36 of the slide rail 24 and the first projecting portion 42 of the slide lid 22 is avoided. Thereby, for example, compared to a structure wherein the first abutting portion 34 and the second abutting portion 36 are alternately disposed along the rail longitudinal direction, the slide lid 22 can smoothly slide relative to the slide rail 24 even if the projection amount H1 of the first abutting portion 34, the projection amount H2 of the second abutting portion 36, the projection amount T1 of the first projecting portion 42, the projection amount T2 of the second projecting portion 44, and the like are not set strictly.

From the above, in the aforementioned slide structure S, with a simple structure wherein the second abutting portion 36 is provided relative to the first abutting portion 34 at the position separated in the rail longitudinal direction and separated in the second direction, the slide lid 22 can smoothly slide relative to the slide rail 24, and the rattling of the slide lid 22 at a predetermined position (in the present embodiment, the open position and the closed position of the slide lid 22) can be suppressed.

Also, in the slide structure S, the pair of guide wall portions 26 and 28 is divided with the first area 30 and the second area 32, and the first abutting portion 34 is disposed in the first area 30 and the second abutting portion 36 is disposed in the second area 32. Consequently, when the slide lid 22 slides on the slide rail 24, while suppressing the slide lid 22 from a lateral shift (a shift in the second direction) relative to the slide rail 24, the top portion 42A of the first projecting portion 42 is moved along the first area 10 to abut against the top portion 34B of the first abutting portion 34, and the top portion 44A of the second projecting portion 44 is moved along the second area 32 to abut against the top portion 36B of the second abutting portion 36. Thereby, the slide lid 22 can slide relative to the slide rail 24 more smoothly.

Moreover, in the slide structure S, both end portions in the respective rail longitudinal direction of the first abutting portion 34 and the second abutting portion 36 are respectively inclined so as to become the inclined faces 34A and 36A. Consequently, when the slide lid 22 slides on the slide rail 24, the top portion 42A of the first projecting portion 42 can smoothly move to the top portion 34B of the first abutting portion 34, and the second projecting portion 44 can smoothly move to the top portion 36B of the second abutting portion 36.

Furthermore, in the slide structure S, both end portions in the respective rail longitudinal direction of the third abutting portion 38 and the fourth abutting portion 40 are respectively inclined so as to become the inclined faces 38A and 40A. Consequently, when the slide lid 22 slides on the slide rail 24, the top portion 46A of the third projecting portion 46 smoothly climbs over the top portion 38B of the third abutting portion 38, and the top portion 48A of the fourth projecting portion 48 smoothly climbs over the top portion 40B of the fourth abutting portion 40. Thereby, in the aforementioned slide structure S, the slide lid 22 can smoothly slide to the predetermined position where the rattling of the slide lid 22 can be suppressed.

Furthermore, in the slide structure S, the respective projection amounts H1, H2, H3, and H4 of the first abutting portion 34, the second abutting portion 36, the third abutting portion 38, and the fourth abutting portion 40 are smaller than the respective projection amounts T1, T2, T3, and T4 of the first projecting portion 42, the second projecting portion 44, the third projecting portion 46, and the fourth projecting portion 48. Consequently, for example, compared to a structure wherein the respective projection amounts H1, H2, H3, and H4 are larger than the respective projection amounts T1, T2, T3, and T4, at a production time of the slide rail 24, a size accuracy of the slide rail 24 can be easily obtained.

Also, in the slide structure S, the first gap between the guide wall face 26A of the guide wall portion 26 and the first projecting portion 42 differs from the second gap between the guide wall face 26A of the guide wall portion 26 and the second projecting portion 44. Incidentally, in the present embodiment, the second gap is smaller than the first gap so as to effectively suppress the rattling of the slide lid 22 relative to the slide rail 24 when the slide lid 22 slides on the slide rail 24 by the abutting of the guide wall face 26A of the guide wall portion 26 and the second projecting portion 44.

Then, in the slide structure S, in the slide lid 22, there is provided the third projecting portion 46 in the first direction and on the side opposite to the first projecting portion 42, and there is provided the fourth projecting portion 48 in the first direction and on the side opposite to the second projecting portion 44, so that when the slide lid 22 slides on the slide rail 24, a sliding area (contact area) of the slide lid 22 and the slide rail 24 is reduced, and the sliding of the slide lid 22 relative to the slide rail 24 becomes more smooth.

Other Embodiments

Figure 11A:
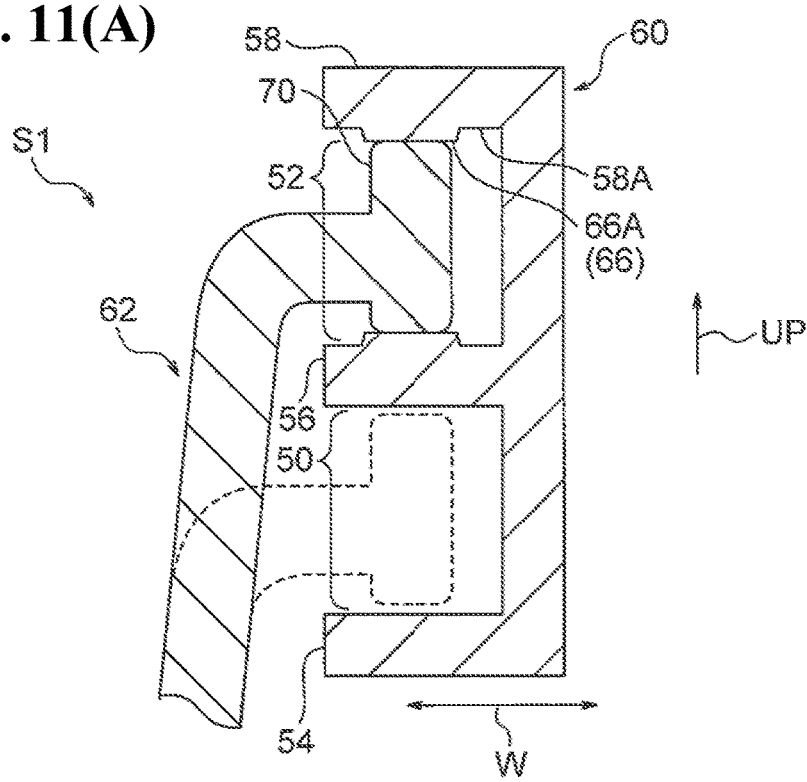
FIG. 11(A) is an end view (enlarged view of a portion corresponding to FIG. 4(B)) of essential parts of the first modified example of the slide structure of one embodiment according to the present invention.
Figure 11B:
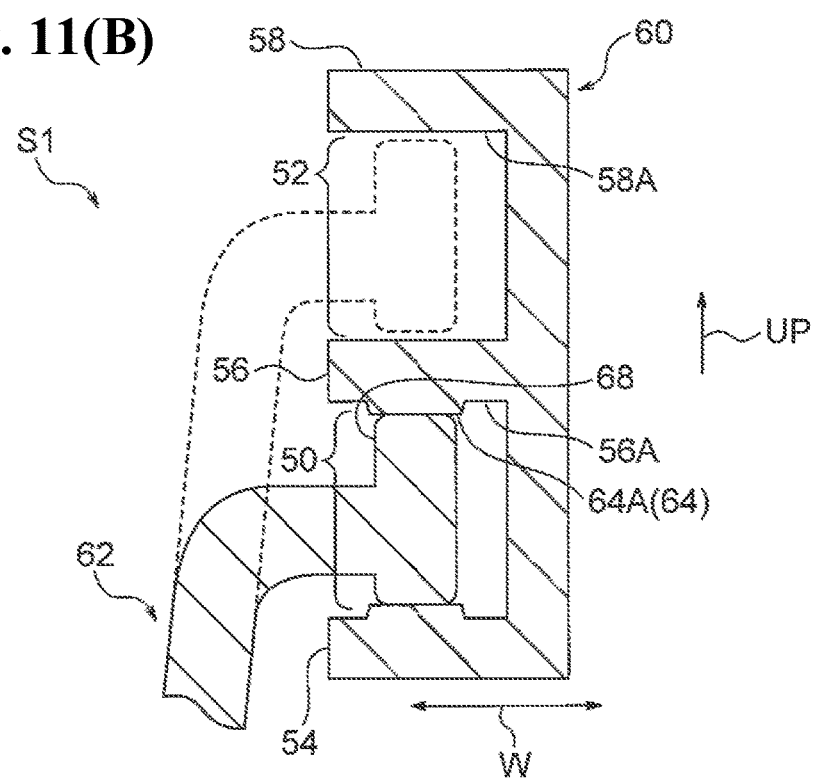
FIG. 11(B) is an end view of the other essential parts of the first modified example in FIG. 11(A)

In the slide structure S of the aforementioned embodiment, there are formed the first area 30 and the second area 32 between the pair of guide wall portions 26 and 28. Namely, the first area 30 and the second area 32 are formed to be provided in parallel in the second direction; however the present invention is not limited to the aforementioned structure. For example, as with a slide structure S1 of a first modified example shown in FIG. 11(A) and FIG. 11(B), a first area 50 and a second area 52 may be formed to be provided together in the first direction. Specifically, the slide structure S1 includes a slide rail 60 provided with three or more (three in the first modified example) guide wall portions 54, 56, and 58 disposed to be opposed at an interval in the first direction; and a slide lid 62 corresponding to the slide rail 60. In the slide rail 60, on one guide wall face (in the present embodiment, a guide wall face 56A of the guide wall portion 56) of the guide wall portion 54 and the guide wall portion 56 disposed to be opposed to each other, there is provided a convex first abutting portion 64 at an interval in the rail longitudinal direction. Also, in the slide rail 60, on one guide wall face (in the present embodiment, a guide wall face 58A of the guide wall portion 58) of the guide wall portion 56 and the guide wall portion 58 disposed to be opposed to each other, there is provided a convex second abutting portion 66 at an interval in the rail longitudinal direction at a position separated in the rail longitudinal direction relative to the first abutting portion 64. Also, in the slide lid 62, on one side in the sliding direction, there is provided a first projecting portion 68 disposed between the guide wall portion 54 and the guide wall portion 56, and abutting against a top portion 64A of the first abutting portion 64. Also, on the other side in the sliding direction, there is provided a second projecting portion 70 disposed between the guide wall portion 56 and the guide wall portion 58, and abutting against a top portion 66A of the second abutting portion 66 in a state wherein the first projecting portion 68 abuts against the top portion 64A of the first abutting portion 64. In the slide structure S1, the operation effect same as the slide structure S of the aforementioned embodiment can be obtained.

Figure 12A:
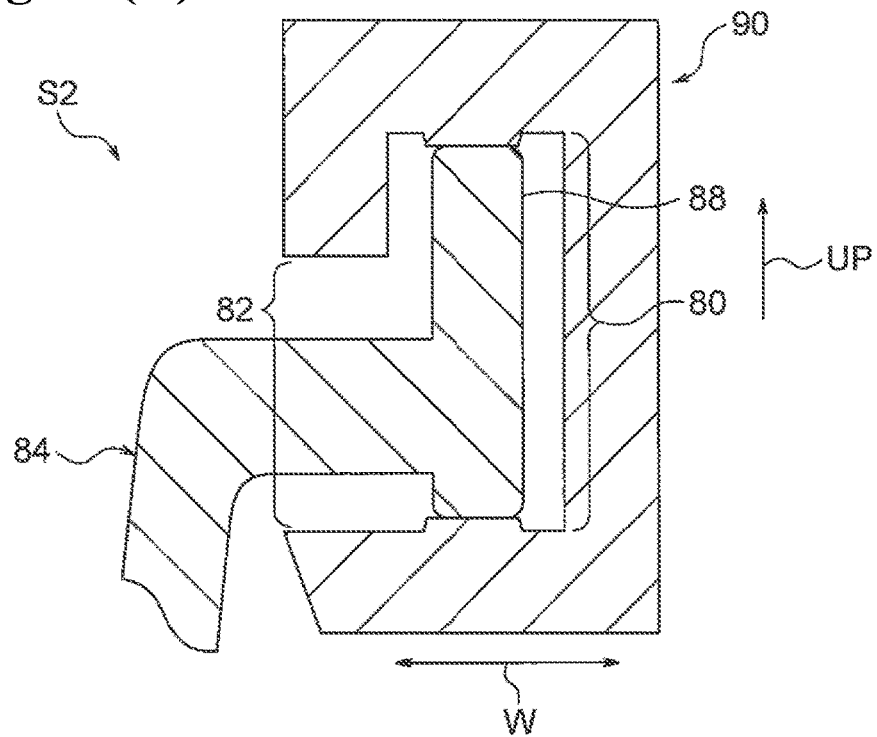
FIG. 12(A) is an end view (enlarged view of a portion corresponding to FIG. 4(B)) of essential parts of a second modified example of the slide structure of one embodiment according to the present invention.
Figure 12B:
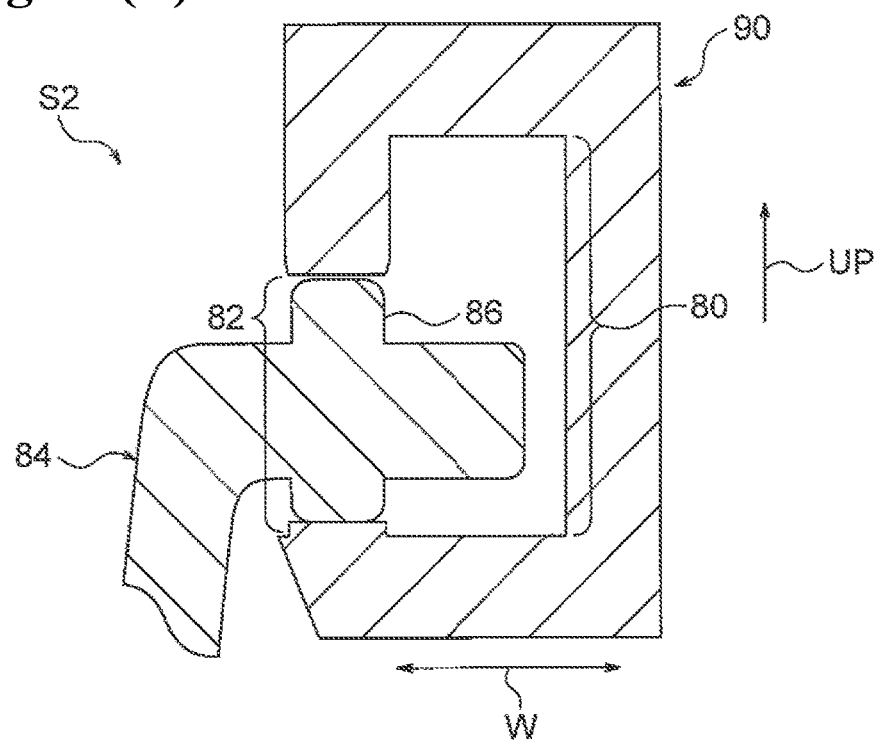
FIG. 12(B) is an end view of the other essential parts of the second modified example in FIG. 12(A)

Also, in the slide structure S of the aforementioned embodiment, the interval L1 in the first area 30 is larger than the interval L2 in the second area 32; however, the present invention is not limited to the above-mentioned structure. For example, as with a slide structure S2 of a second modified example shown in FIG. 12(A) and FIG. 12(B), an interval L1 in a first area 82 may be formed to be smaller than an interval L2 in a second area 80. In the slide structure S2, a first projecting portion 86 of a slide lid 84 is disposed in the first area 82, and a second projecting portion 88 is disposed in the second area 80. Also, the second projecting portion 88 is inserted into the second area 80 from the rail longitudinal direction of a slide rail 90, and the slide lid 84 and the slide rail 90 are assembled. Thereby, in the slide structure S2 of the second modified example, the operation effect same as the slide structure S of the aforementioned embodiment can be obtained.

Figure 13:
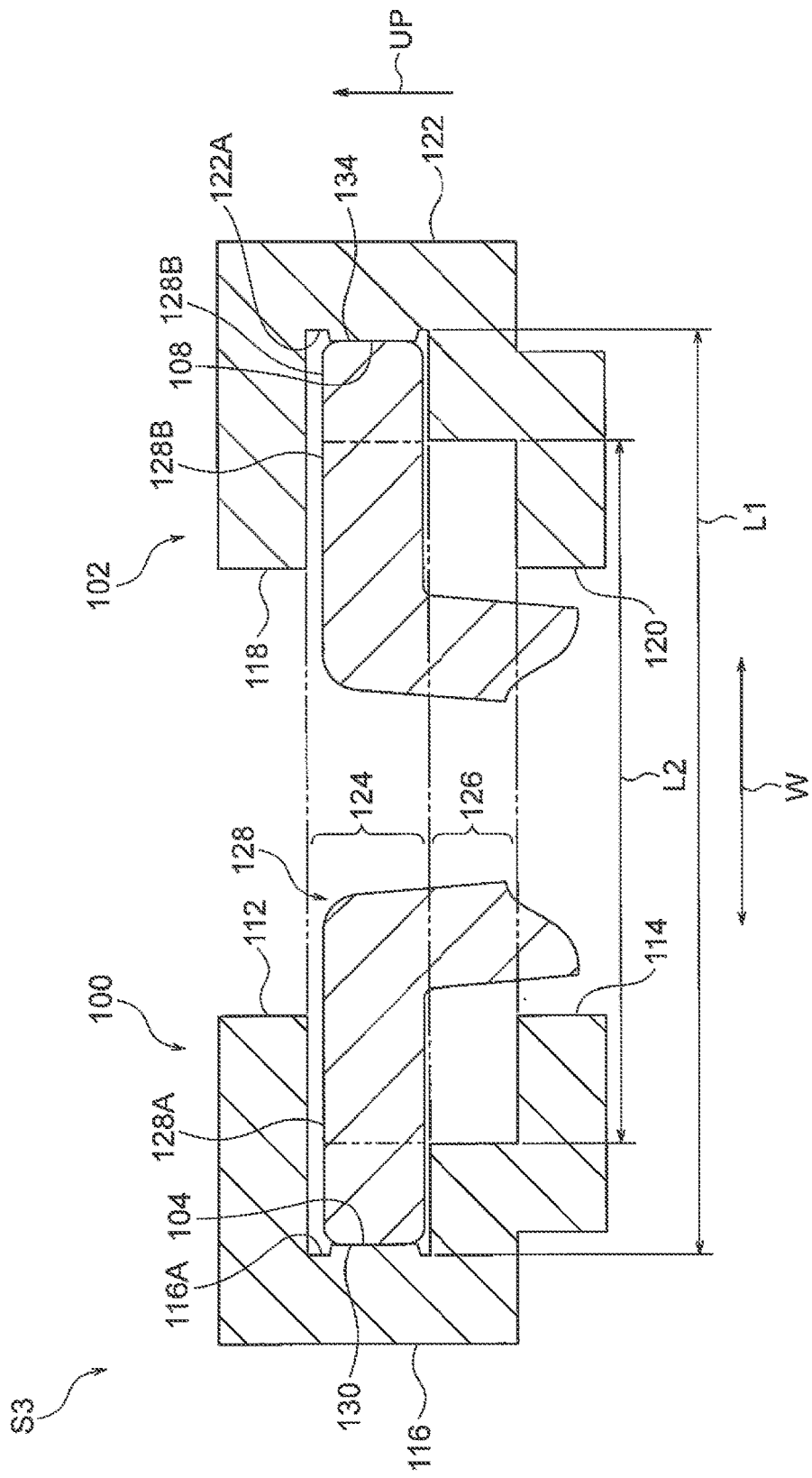
FIG. 13 is an end view (enlarged view of a portion corresponding to FIG. 4(B)) of essential parts of a third modified example of the slide structure of one embodiment according to the present invention.
Figure 14:
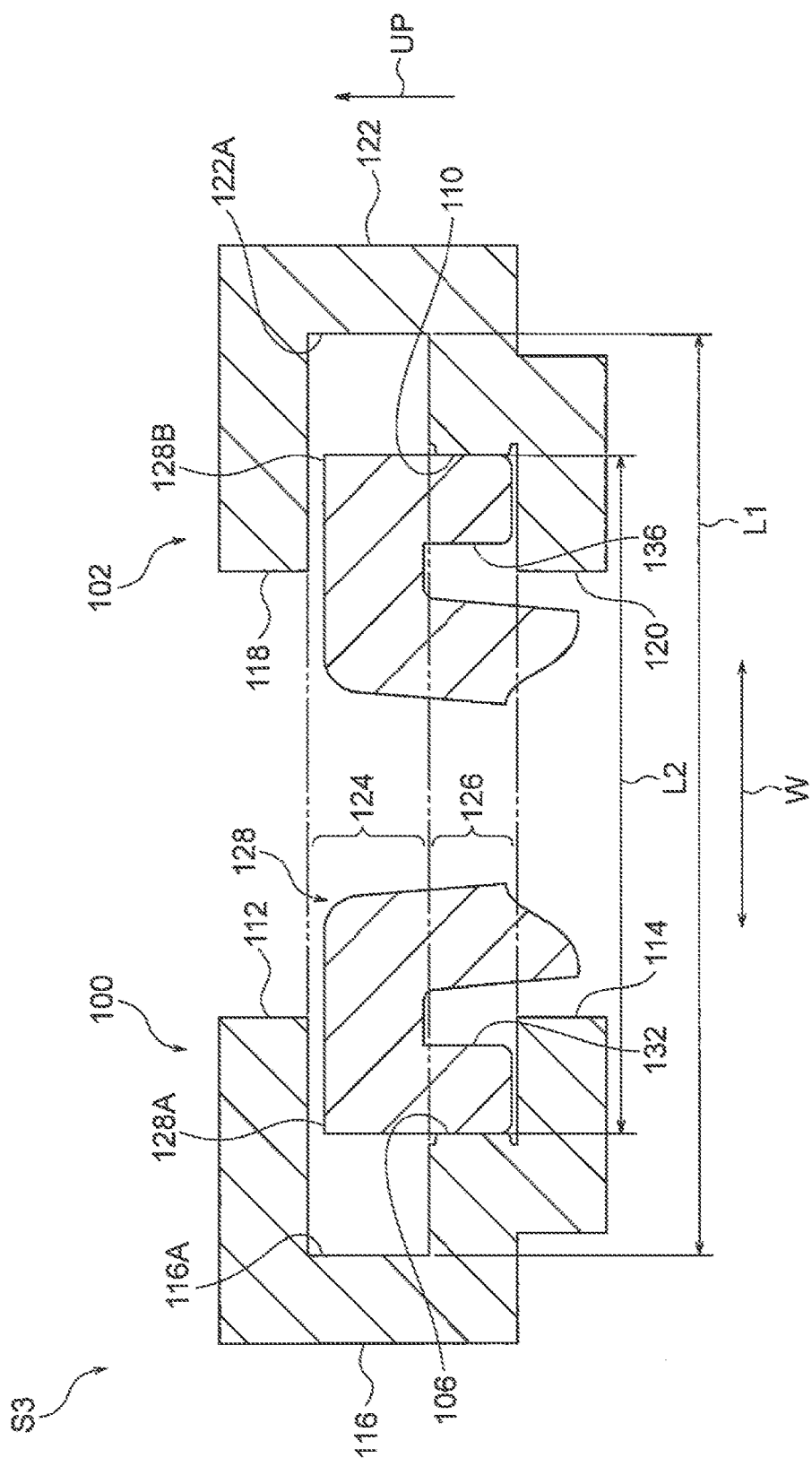
FIG. 14 is an end view of the other essential parts of the third modified example in FIG. 13.

Also, in the slide structure S of the aforementioned embodiment, the first abutting portion 34 is provided in the guide wall portion 26 of the slide rail 24, and the second abutting portion 36 is provided in the guide wall portion 28; however, the present invention is not limited to the aforementioned structure. For example, as with a slide structure S3 of a third modified example shown in FIG. 13 and FIG. 14, among a pair of slide rails 100 and 102 disposed to be opposed at an interval in the second direction (a right-and-left direction in FIG. 13 and FIG. 14) orthogonal to the rail longitudinal direction and the first direction (an up-and-down direction in FIG. 13 and FIG. 14), a first abutting portion 104 and a second abutting portion 106 may be provided in one (a left side in FIG. 13 and FIG. 14) slide rail 100, and a third abutting portion 108 and a fourth abutting portion 110 may be provided in the other (a right side in FIG. 13 and FIG. 14) slide rail 102.

Specifically, the slide rail 100 is provided with a pair of guide wall portions 112 and 114 disposed to be opposed in the first direction; and a guide wall portion 116 extending in the first direction and connecting end portions of the guide wall portions 112 and 114. Also, on a guide wall face 116A having a step shape forming an inner face of the guide wall portion 116, there is provided the convex first abutting portion 104 at an interval in the rail longitudinal direction, and on the guide wall face 116A, there is provided the convex second abutting portion 106 at an interval in the rail longitudinal direction at a position separated in the rail longitudinal direction relative to the first abutting portion 104 and separated in the first direction. On the other hand, the slide rail 102 is provided with a pair of guide wall portions 118 and 120 disposed to be opposed in the first direction; and a guide wall portion 122 extending in the first direction and connecting end portions of the guide wall portions 118 and 120. Also, on a guide wall face 122A having a step shape forming an inner face of the guide wall portion 122, there is provided the convex third abutting portion 108 at an interval in the rail longitudinal direction, and on the guide wall face 122A, there is provided the convex fourth abutting portion 110 at an interval in the rail longitudinal direction at a position separated in the rail longitudinal direction relative to the third abutting portion 108 and separated in the first direction.

Incidentally, the guide wall portions 116 and 122 disposed to be opposed in the slide rails 100 and 102 are portions restricting a movement in the second direction (the right-and-left direction in FIG. 13 and FIG. 14) of end portions 128A and 128B in the width direction of the later-described slide lid 128 disposed between the guide wall portions 116 and 122. Also, in an interval between the guide wall face 116A and the guide wall face 122A disposed to be opposed, a first area 124 on one side (upper side) in the first direction differs from a second area 126 adjacent to the other side (lower side) in the first direction relative to the first area 124. In detail, an interval L1 in the first area 124 is larger than an interval L2 in the second area 126. The slide lid 128 is disposed between the guide wall portions 116 and 122 disposed to be opposed, and can slide in the rail longitudinal direction. On one side in the sliding direction of one end portion (end portion on a left side in FIG. 13 and FIG. 14) 128A in a width direction of a plate shape of the slide lid 128, there is provided a first projecting portion 130 abutting against a top portion 104A of the first abutting portion 104, and on the other side in the sliding direction, there is provided a second projecting portion 132 abutting against a top portion 106A of the second abutting portion 106 in a state wherein the first projecting portion 130 abuts against the top portion 104A of the first abutting portion 104. When the slide lid 128 slides on the slide rail 100, the first projecting portion 130 moves the first area 124, and a top portion abuts against the top portion 104A of the first abutting portion 104.

On the other hand, when the slide lid 128 slides on the slide rail 100, the second projecting portion 132 moves the second area 126, and a side face abuts against the top portion 106A of the second abutting portion 106. Also, on one side in the sliding direction of the other end portion (end portion on the right side in FIG. 13 and FIG. 14) 128B in the width direction of the plate shape of the slide lid 128, there is provided a third projecting portion 134 abutting against a top portion 108A of the third abutting portion 108. Also, on the other side in the sliding direction, in a state wherein the third projecting portion 134 abuts against the top portion 108A of the third abutting portion 108, there is provided a fourth projecting portion 136 abutting against a top portion 110A of the fourth abutting portion 110. When the slide lid 128 slides on the slide rail 102, the third projecting portion 134 moves the first area 124, and a top portion abuts against the top portion 108A of the third abutting portion 108. On the other hand, when the slide lid 128 slides on the slide rail 102, the fourth projecting portion 136 moves the second area 126, and a side face abuts against the top portion 110A of the fourth abutting portion 110.

In the aforementioned slide structure S3, there is provided the second abutting portion 106 relative to the first abutting portion 104 at a position separated in the rail longitudinal direction of the slide rail 100, and the fourth abutting portion 110 is provided relative to the third abutting portion 108 at a position separated in the rail longitudinal direction of the slide rail 102, so that the slide lid 128 slides along the rail longitudinal direction, and in a state wherein the first projecting portion 130 abuts against the top portion 104A of the first abutting portion 104, the second projecting portion 132 abuts against the top portion 106A of the second abutting portion 106, and in a state wherein the third projecting portion 134 abuts against the top portion 108A of the third abutting portion 108, the fourth projecting portion 136 abuts against the top portion 110A of the fourth abutting portion 110. Then, the slide lid 128 is supported by a pair of rails at two portions at an interval in the rail longitudinal direction so as to suppress the rattling (rattling in the second direction) of the slide lid 128 relative to the rails.

Also, in the slide structure S3, there is provided the second abutting portion 106 relative to the first abutting portion 104 at a position separated in the first direction, and there is provided the fourth abutting portion 110 relative to the third abutting portion 108 at a position separated in the first direction. Consequently, when the slide lid 128 slides on the slide rail 100, abutting of the first abutting portion 104 of the slide rail 100 and the second projecting portion 132 is avoided, and abutting of the second abutting portion 106 and the first projecting portion 130 is avoided. Likewise, when the slide lid 128 slides on the slide rail 102, abutting of the third abutting portion 108 of the slide rail 102 and the fourth projecting portion 136 is avoided, and abutting of the fourth abutting portion 110 and the third projecting portion 134 is avoided. Thereby, even if the respective projection amounts of the first to fourth abutting portions 104, 106, 108, and 110, and the first to fourth projecting portions 130, 132, 134, and 136 are not set strictly, the slide lid 128 can smoothly slide relative to the slide rails 100 and 102. From the above, in the aforementioned slide structure S3, with a simple structure, the slide lid 128 can smoothly slide relative to the slide rails 100 and 102, and the rattling of the slide lid 128 at the predetermined position can be suppressed.

In the aforementioned embodiments, the slide structure S is applied to the storage container 20 for the vehicle; however, the present invention is not limited to the above-mentioned structure, and the slide structure S may be applied to a storage container other than the storage container for the vehicle. For example, the slide structure S may be applied to a housing portion for utensils around a kitchen, furniture, office supplies, and the like.

In the above, one embodiment of the present invention has been explained: however, the present invention is not limited to the above, and needless to say that the present invention can be performed by being variously modified other than the above within a range that it does not exceed the subject of the present invention.

The disclosure of Japanese Patent Application No. 2016-31021, filed on Feb. 22, 2016, is incorporated in the application.

While the invention has been explained with reference to the specific embodiments of the invention, the explanation is illustrative and the invention is limited only by the appended claims.

What is claimed is:
1. A slide structure, comprising:
  a rail including a pair of guide wall portions spaced apart from each other in a first direction orthogonal to a longitudinal direction of the rail, one of the pair of guide wall portions including a guide wall face, first convex abutting portions provided on the guide wall face at an interval in the longitudinal direction, and second convex abutting portions provided on the guide wall face at the interval in the longitudinal direction, the first convex abutting portions being arranged separately from the second convex abutting portions in the longitudinal direction and in a second direction orthogonal to the longitudinal direction and the first direction; and a slider disposed between the pair of guide wall portions slidably along the rail in the longitudinal direction, and including a first projecting portion, and a second projecting portion arranged separately from the first projecting portion in a sliding direction of the slider and in the second direction such that the first projecting portion abuts one of the first convex abutting portions, and the second projecting portion abuts against one of the second convex abutting portions when the first projecting portion abuts against the one of the first convex abutting portions.

2. A slide structure according to claim 1, wherein the guide wall face includes first areas, and second areas adjacent to the first areas in the second direction, and the first convex abutting portions are disposed in the first areas, and the second convex abutting portions are disposed in the second areas.

3. A slide structure according to claim 2, wherein the guide wall face includes a step portion extending in the first direction to form a step between the first areas and the second areas, and a distance between the pair of guide wall portions at the first areas is longer than that of the second areas in the first direction.

4. A slide structure according to claim 1, wherein each of the first convex abutting portions and the second convex abutting portions includes two end portions inclinedly formed in the longitudinal direction, respectively.

5. A slide structure according to claim 1, wherein the first convex abutting portions and the second convex abutting portions project toward the slider, and the first projecting portion and the second projection portion project toward the one of the pair of guide wall portions, and projecting lengths of the first convex abutting portions and the second convex abutting portions are smaller than those of the first projecting portion and the second projecting portion in the first direction.

6. A slide structure according to claim 1, wherein a gap between the guide wall face and the first projecting portion has a size different from a gap between the guide wall face and the second projecting portion.

7. A slide structure according to claim 1, wherein the slider includes a third projecting portion provided in the first direction at a side opposite to the first projecting portion, and a fourth projecting portion provided in the first direction at a side opposite to the second projecting portion.

8. A slide structure according to claim 7, wherein another of the pair of guide wall portions includes another guide wall face, third convex abutting portions on the another guide wall face at portions facing the first convex abutting portions, and fourth convex abutting portions on the another guide wall face at portions facing the second convex abutting portions, and the third projecting portion abuts against one of the third convex abutting portions when the first projecting portion abuts against the one of the first convex abutting portions, and the fourth projecting portion abuts against one of the fourth convex abutting portions when the second projecting portion abuts against the one of the second convex abutting portions.

9. A slider structure according to claim 1, wherein the first direction is a vertical direction relative to the longitudinal direction of the rail, and the second direction is a lateral direction relative to the vertical direction and the longitudinal direction.

10. A slide structure, comprising:

a rail including at least three guide wall portions spaced apart from each other in a first direction orthogonal to a longitudinal direction of the rail, the at least three guide wall including a first guide wall portion, a second guide wall portion, a third guide wall portion arranged between the first guide wall portion and the second guide wall portion, one of the first guide wall portion and the third guide wall portion including a first guide wall face and first convex abutting portions provided on the first guide wall face at an interval in the longitudinal direction, and one of the second guide wall portion and the third guide wall portion including a second guide wall face and second convex abutting portions provided on the second guide wall face at the interval in the longitudinal direction, the first convex abutting portions being arranged separately from the second convex abutting portions in the first direction and the longitudinal direction; and a slider sliding along the rail in the longitudinal direction, the slider including a first projecting portion disposed between the first guide wall portion and the third guide wall portion, and a second projecting portion disposed between the second guide wall portion and the third guide wall portion and arranged separately from the first projecting portion in a sliding direction of the slider and in the first direction such that the first projecting portion abuts against one of the first convex abutting portions, and the second projecting portion abuts against one of the second convex abutting portions when the first projecting portion abuts against the one of the first convex abutting portions.

11. A slide structure, comprising, a pair of rails including guide wall portions extending in a first direction orthogonal to a longitudinal direction of the pair of rails, and spaced apart from each other in a second direction orthogonal to the longitudinal direction and the first direction, and a slider disposed between the guide wall portions of the pair of rails, and sliding along the pair of rails in the longitudinal direction, wherein one of the guide wall portions includes first convex abutting portions provided at an interval in the longitudinal direction, and second convex abutting portions provided at the interval in the longitudinal direction, the first convex abutting portions being arranged separately from the second convex abutting portions in the first direction and in the longitudinal direction, and the slider includes a first projecting portion, and a second projecting portion arranged separately from the first projecting portion in a sliding direction of the slider and in the first direction such that the first projecting portion abuts against one of the first convex abutting portions, and the second projecting portion abuts against one of the second convex abutting portions when the first projecting portion abuts against the one of the first convex abutting portions.

* * * * *